US008700607B2

(12) United States Patent
Maag

(10) Patent No.: US 8,700,607 B2
(45) Date of Patent: Apr. 15, 2014

(54) APPLYING DATA REGRESSION AND PATTERN MINING TO PREDICT FUTURE DEMAND

(75) Inventor: Andrew Maag, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 1872 days.

(21) Appl. No.: 11/460,401

(22) Filed: Jul. 27, 2006

(65) Prior Publication Data

US 2007/0033185 A1 Feb. 8, 2007

Related U.S. Application Data

(60) Provisional application No. 60/704,575, filed on Aug. 2, 2005.

(51) Int. Cl.
*G06F 17/30* (2006.01)

(52) U.S. Cl.
USPC ............ 707/719; 707/720; 707/751; 707/798

(58) Field of Classification Search
USPC ....................... 707/1–10, 719, 720, 751, 798
See application file for complete search history.

(56) References Cited

U.S. PATENT DOCUMENTS

| | | | | |
|---|---|---|---|---|
| 6,134,555 A * | 10/2000 | Chadha et al. | ................. | 707/737 |
| 2001/0054032 A1* | 12/2001 | Goldman et al. | ............... | 706/12 |
| 2002/0152305 A1* | 10/2002 | Jackson et al. | ................. | 709/224 |
| 2003/0009456 A1 | 1/2003 | Shintani et al. | ................... | 707/6 |
| 2003/0023591 A1 | 1/2003 | Ma et al. | ............................. | 707/6 |
| 2003/0217055 A1 | 11/2003 | Lee et al. | ........................... | 707/6 |
| 2003/0236785 A1 | 12/2003 | Shintani et al. | ................... | 707/6 |
| 2004/0049504 A1 | 3/2004 | Hellerstein et al. | ............... | 707/5 |
| 2005/0027665 A1* | 2/2005 | Thiesson et al. | ................ | 706/25 |

OTHER PUBLICATIONS

Unknown Author, "Regression Analysis", Aug. 26, 2008, Wikipedia.*
Unkown Author, "Regression Analysis", Aug. 26, 2008.*
"Association Rule Mining," COMP 290-90 Seminar, University of North Carolina at Chapel Hill, Fall 2003, http://www.cs.unc.edu/Courses/comp290-90-f03/associationrule1.pdf.
J. Han et al., "Mining Frequent Patterns Without Candidate Generation," Proceedings of ACM SIGMOD Int'l Conference on Management of Data, pp. 1-12 (2000).
J. Han, et al., "Mining Frequent Patterns Without Candidate Generation," ftp://ftp.fas.sfu.ca/pub/cs/han/slides/alamden00/ppt.
U.S. Appl. No. 10/099,404, filed Mar. 15, 2002, Darr et al.
U.S. Appl. No. 10/870,360, filed Jun. 17, 2004, Sharma et al.
B. Goethals, "Survey on Frequent Pattern Mining," HIIT Basic Research Unit, Department of Computer Science, University of Helsinki, Finland (2003).

(Continued)

*Primary Examiner* — Vincent F Boccio
(74) *Attorney, Agent, or Firm* — Terrile, Cannatti, Chambers & Holland, LLP; Michael Rocco Cannatti

(57) ABSTRACT

A data processing system processes transaction database information to predict future demand using data regression techniques to extract trend line information from historical pattern frequency values. By extrapolating the trend line, a predicted pattern frequency value may be calculated. By applying regression techniques (such as least-squares approximation), the trend line information may be extracted and projected to predict the future pattern frequency which may be applied to calculate the expected value of a recommendation rule.

20 Claims, 3 Drawing Sheets

(56) References Cited

OTHER PUBLICATIONS

X. Shang, et al., "SQL Based Frequent Pattern Mining Without Candidate Generation" ACM Symposium of Applied Computing, Mar. 2004, pp. 1-12.

X. Shang, et al., "SQL Based Frequent Pattern Mining Without Candidate Generation" (Poster Abstract) ACM Symposium of Applied Computing, pp. 618-619 (Mar. 2004).

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec1.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec2.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec3.ppt.

J. Han et al., "Data Mining: Concepts and Techniques," Department of Computer Science, University of Illinois at Urbana-Champaign, http://people.sabanciuniv.edu/~ysaygin/courses/datamining/lecture%20notes.lec4.ppt.

C. Giannella et al., "Mining Frequent Itemsets Over Arbitrary Time Intervals in Data Streams," Technical Report 587, Computer Science Department, Indiana University, Nov. 2003 http://www.cs.indiana.edu/cgi-bin/techreports/TRNNN.cgi?trnum=TR587.

C. Giannella et al., "Mining Frequent Patterns in Data Streams at Multiple Time Granularities," Chap. 3, in Kargupta et al., Next Generation Data Mining, AAAI/MIT, 2003, http://www.cs.sfu.ca/~jpei/publications/.

"MAIDS: Mining Alarming Incidents in Data Streams," A discussion on the MAIDS project, May 20, 2003, http://maids.ncsa.uiuc.edu/documents/presentations/maids03.ppt.

W.G. Teng et al., "A Regression-Based Temporal Pattern Mining Scheme for Data Streams," Proceedings of the $29^{th}$ VLDB Conference, Berlin, Germany 2003.

R. Agrawal et al., "Mining Association Rules Between Sets of Items in Large Databases," Proceedings of ACM SIGMOD Int'l Conference on Management of Data, pp. 207-216 (1993).

* cited by examiner

APPLYING DATA REGRESSION AND PATTERN MINING TO PREDICT FUTURE DEMAND

CROSS-REFERENCE TO RELATED APPLICATION

This application claims the benefit under 35 U.S.C. §119 (e) of U.S. Provisional Application No. 60/704,575, filed Aug. 2, 2005, entitled "Applying Data Regression and Pattern Mining to Predict Future Demand," the entirety of which is incorporated herein by reference.

BACKGROUND OF THE INVENTION

1. Field of the Invention

The present invention relates in general to the field of database analysis. In one aspect, the present invention relates to a system and method for database pattern mining operations for generating and evaluating association rules contained in database records.

2. Description of the Related Art

The ability of modern computers to assemble, record and analyze enormous amounts of data has created a field of database analysis referred to as data mining. Data mining is used to discover association relationships in a database by identifying frequently occurring patterns in the database. These association relationships or rules may be applied to extract useful information from large databases in a variety of fields, including selective marketing, market analysis and management applications (such as target marketing, customer relation management, market basket analysis, cross selling, market segmentation), risk analysis and management applications (such as forecasting, customer retention, improved underwriting, quality control, competitive analysis), fraud detection and management applications and other applications (such as text mining (news group, email, documents), stream data mining, web mining, DNA data analysis, etc.). For example, association rules have been applied to model and emulate consumer purchasing activities. Association rules describe how often items are purchased together. For example, an association rule, "laptop⇒speaker (80%)," states that four out of five customers that bought a laptop computer also bought speakers.

The first step in generating association rules is to review a database of transactions to identify meaningful patterns (referred to as frequent patterns, frequent sets or frequent itemsets) in a transaction database, such as significant purchase patterns that appear as common patterns recurring among a plurality of customers. Typically, this is done by using thresholds such as support and confidence parameters, or other guides to the data mining process. These guides are used to discover frequent patterns, i.e., all sets of itemsets that have transaction support above a pre-determined minimum support S and confidence C threshold. Various techniques have been proposed to assist with identifying frequent patterns in transaction databases, including using "Apriori" algorithms to generate and test candidate sets, such as described by R. Agrawal et al., "Mining Association Rules Between Sets of Items in Large Databases," Proceedings of ACM SIGMOD Int'l Conf. on Management of Data, pp. 207-216 (1993). However, candidate set generation is costly in terms of computational resources consumed, especially when there are prolific patterns or long patterns in the database and when multiple passes through potentially large candidate sets are required. Other techniques (such as described by J. Han et al., "Mining Frequent Patterns Without Candidate Generation," Proceedings of ACM SIGMOD Int'l Conf. on Management of Data, pp. 1-12 (2000)) attempt to overcome these limitations by using a frequent pattern tree (FPTree) data structure to mine frequent patterns without candidate set generation (a process referred to as FPGrowth). With the FPGrowth approach, frequency pattern information is stored in a compact memory structure.

Once the frequent sets are identified, the association rules are generated by constructing the power set (set of all subsets) of the identified frequent sets, and then generating rules from each of the elements of the power set. For each rule, its meaningfulness (i.e., support, confidence, lift, etc.) is calculated and examined to see if it meets the required thresholds. For example, if a frequent pattern {A, B, C} is extracted—meaning that this set occurs more frequently than the minimum support S threshold in the set of transactions—then several rules can be generated from this set:

{A}⇒{B, C}
{B}⇒{A, C}
{C}⇒{A, B}
{A, B}⇒{C} etc.

where a rule A⇒B which indicates that "Product A is often purchased together with Product B," meaning that there is an association between the sales of Products A and B. Such rules can be useful for decisions concerning product pricing, product placement, promotions, store layout and many other decisions.

Conventional approaches for generating frequent patterns (e.g., with a standard market basket analysis techniques) look at the frequency of item patterns in orders, but do not attempt to determine if patterns are becoming more or less frequent over time. Using shorter and more recent time periods for determining pattern frequency generally increases the weighting of recent pattern frequency, but typically lowers the amount of statistical significance to the data. Conversely, using longer time periods for determining pattern frequency yields more statistical confidence in the data, but decreases the accuracy due to the inclusion of older pattern frequency data. Accordingly, a need exists for methods and/or apparatuses for improving the generation and analysis of frequent patterns for use in data mining. There is also a need for improving pattern mining processes to better predict future demand. In addition, there is a need for methods and/or apparatuses for efficiently generating future expected pattern frequency information. Further limitations and disadvantages of conventional systems will become apparent to one of skill in the art after reviewing the remainder of the present application with reference to the drawings and detailed description which follow.

SUMMARY OF THE INVENTION

In accordance with one or more embodiments of the present invention, a system and method are provided for generating more meaningful frequent set data by analyzing frequent pattern data over time to predict frequent pattern trends. In a selected embodiment, frequent pattern trends may be derived by using frequent pattern generation techniques over discrete time slices of transaction data, and then processing the results using numerical calculation techniques, such as least-squares approximation or other higher order interpolation techniques, to extract trend information. By extrapolating the computed trend information into the future, a more accurate frequency prediction is obtained than can be provided by standard averaged frequency techniques. In addition, more accurate predictions may be obtained by focusing the pattern mining review on more recent time slices, due to the increased relevance of recent data. In addition or in the alternative, the pattern mining review of the present invention may use regression techniques to analyze the change in frequency of patterns to predict future behavior by projecting the regression to calculate the expected value of a recommendation rule. In accordance with another embodiment of the present invention, frequent itemset information is accumulated on a constant time interval (week1, week2, week3, etc.) and is used in a regression analysis to make a prediction about future demand.

The objects, advantages and other novel features of the present invention will be apparent from the following detailed description when read in conjunction with the appended claims and attached drawings.

DETAILED DESCRIPTION

An efficient database mining method and apparatus are described for processing frequent patterns from transaction databases by programmatically computing the trend of each pattern frequency over time to provide more accurate frequency prediction for use with generating and evaluating association rules. While various details are set forth in the following description, it will be appreciated that the present invention may be practiced without these specific details. In addition, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
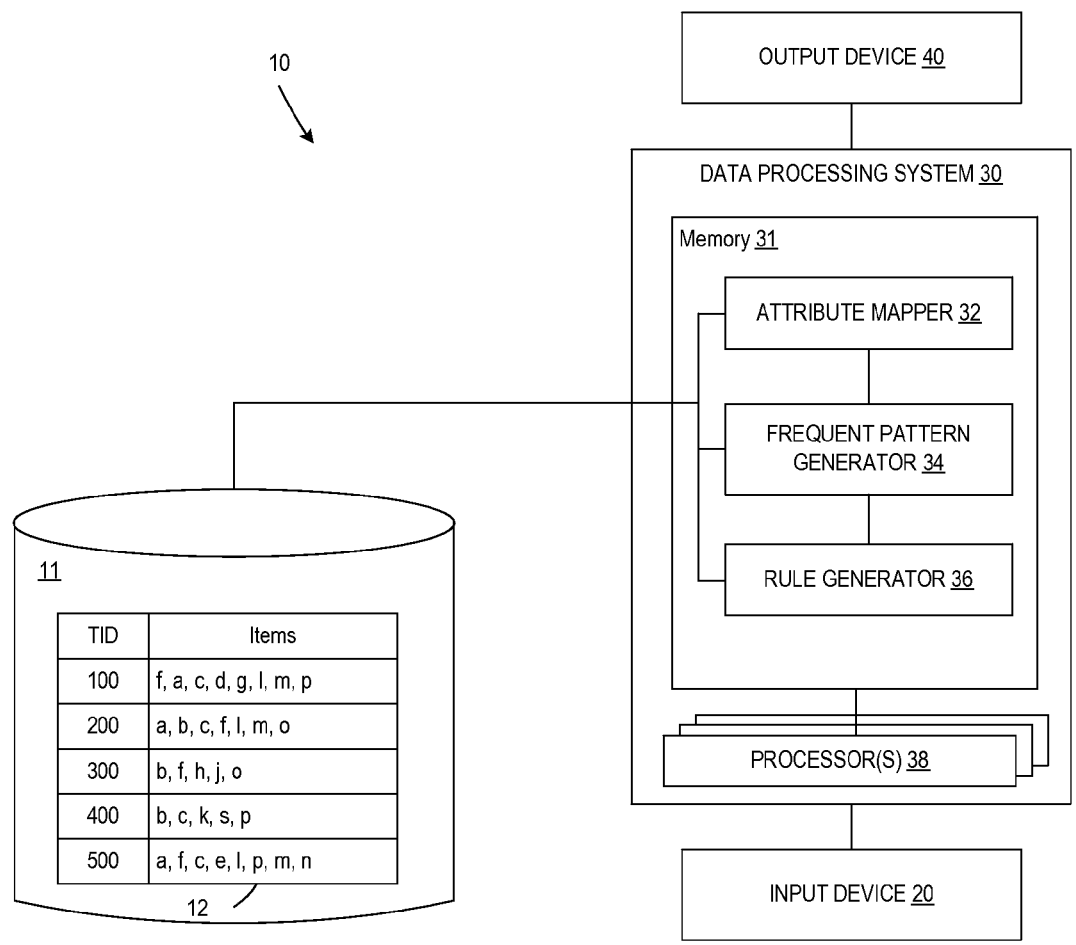
FIG. 1 depicts an exemplary system for mining association rules from a transaction database.

Referring now to FIG. 1, a block diagram depicts an exemplary system for mining attribute-based association rules from frequent patterns identified in a transaction database. In FIG. 1, the system 10 comprises a data processing engine or system 30 coupled to a database 11. The system 10 also includes an input device 20 where at least one condition of the association rules to be mined is input by a user. For example, the input device 20 is used to input the conditions (i.e., support, confidence, lift, etc.) for the association rule to be mined. The output device may be a local display or printer device, or may be a remotely connected computer system, such as a client computer device or network-connected computer device. In a selected embodiment, the system 10 (e.g., a private wide area network (WAN) or the Internet) includes a central server computer system 30 and one or more networked client or server computer systems that are connected to the network as an input device 20 and/or an output device 40. Communication between central server computer system 30 and the networked computer systems typically occurs over a network, such as a public switched telephone network over asynchronous digital subscriber line (ADSL) telephone lines or high-bandwidth trunks, for example, communications channels providing T1 or OC3 service. Networked client computer system(s) typically access central server computer system 30 through a service provider, such as an internet service provider ("ISP") by executing application specific software, commonly referred to as a browser, on the networked client computer systems.

In the data processing system 30, an attribute mapper 32 may be included for mapping a first data set to a second, highly granular data set as described more fully in U.S. patent application Ser. No. 10/870,360 (entitled "Attribute Based Association Rule Mining"), which is assigned to Trilogy Development Group and is hereby incorporated by reference in its entirety. In addition, a frequent pattern generator 34 is included for identifying frequent patterns occurring in the database 11. For example, the frequent pattern generator 34 may use FPGrowth techniques to identify frequent patterns in the transaction data 12 stored in the database 11 meeting the minimum support count input by the user. A rule generator 36 is included for generating association rules from the frequent pattern information, and an output device 40 is also provided for outputting the mined association rules. The database 11 may be connected to the attribute mapper 32, frequent pattern generator 34 and/or rule generator 36. Alternatively, transaction data 12 from the database 11 may be transformed by the attribute mapper 32, passed directly to the frequent pattern generator 34 for processing to identify frequent patterns, and then passed to the rule generator 36 for rule generation.

The attribute mapper 32 is provided for transforming generic item descriptors in the transaction database to provide more detailed item description information concerning various product attributes and/or qualities for the item. For example, part number information may be mapped into more granular product or attribute information identifying specific features of the product, where the specific product or attribute information may be presented as native values. At the frequent pattern generator 34, all of the frequent patterns from the transaction data 12 in the database 11 are compiled, and the support of each frequent pattern may be obtained. At the rule generator 36, at least one association rule is derived by using the frequent pattern information provided by the frequent pattern generator 34. A broad variety of efficient algorithms for mining association rules have been developed in recent years, including algorithms based on the level-wise Apriori framework, TreeProjection and FPGrowth algorithms.

Referring specifically to the mining of frequent pattern information, it will be appreciated that conventional market basket analysis techniques for mining frequent patterns look at the frequency of item patterns in orders, but do not attempt to determine if patterns are becoming more or less frequent over time. Using shorter and more recent time periods for determining pattern frequency generally increases the weighting of recent pattern frequency, but typically lowers the amount of statistical significance to the data. Conversely, using longer time periods for determining pattern frequency yields more statistical confidence in the data, but decreases the accuracy due to the inclusion of older pattern frequency data. A selected embodiment of the present invention balances the accuracy and confidence requirements with a frequent pattern generator module 34 that uses standard approaches to pattern frequency (such as pairwise association rule mining, Apriori, or the FP-growth algorithm) against smaller time slices of transaction data to programmatically compute the trend of each pattern's frequency using a variety of numerical calculation techniques, such as least-squares approximation or other higher order interpolation techniques. The future expected pattern frequency is computed by extrapolating the computed trend line into the future to yield a more accurate frequency prediction than the standard averaged frequency technique.

An example illustration of the advantages of the frequency prediction approach of present invention over conventional approaches is provided in the following table, which contrasts the predicted frequency with the average frequency of a particular pattern (in this case, a processor for a desktop computer).

| A<br>Item | B<br>Week 1 | C<br>Week 2 | D<br>Week 3 | E<br>Week 4 | F<br>Average | G<br>Predicted |
|---|---|---|---|---|---|---|
| Processor A | 60% | 48% | 50% | 35% | 48.25% | 30% |
| Processor B | 40% | 52% | 50% | 65% | 51.75% | 70% |

Figure 2:
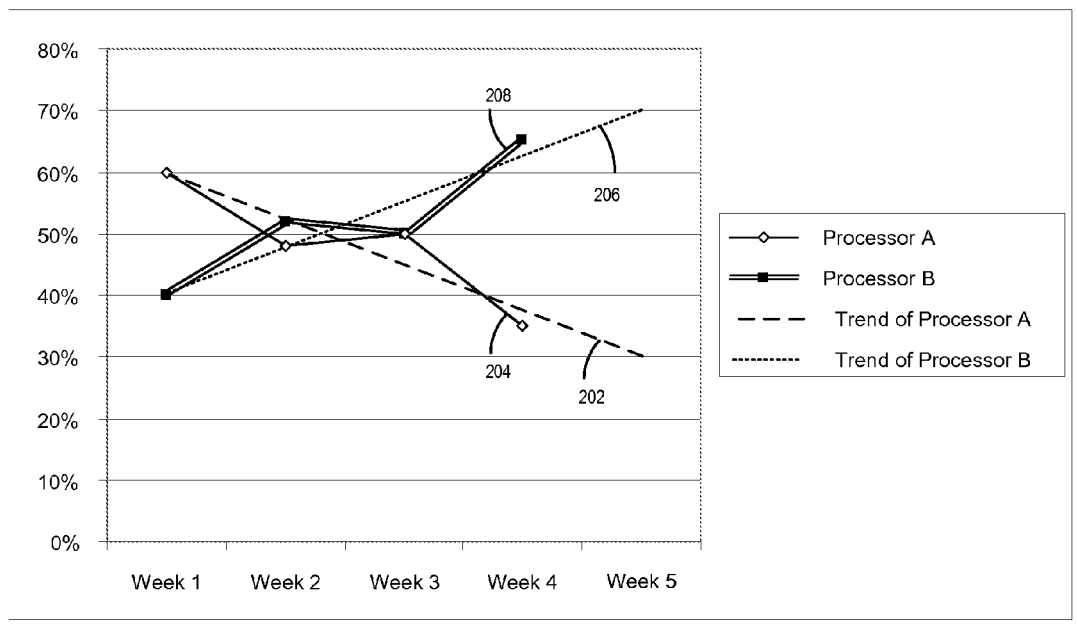
FIG. 2 is an exemplary chart comparison of demand prediction using an average pattern frequency technique and a data regression technique.

Columns B-E show the pattern frequency of each processor per week. Column F shows the average pattern frequency which, for simplicity in this example, assumes that the number of Desktops sold in each week is constant. Column G shows the result of applying a linear least-squares approximation to the pattern frequencies and extrapolating to the fifth week. In this case, (Desktop, Processor A) is a pattern that is declining in frequency, while (Desktop, Processor B) is an emerging pattern. The improved accuracy of the frequency prediction technique of the present invention is readily demonstrated by charting the example comparison data, such as depicted in FIG. 2 which depicts an exemplary chart comparison of demand prediction using an average pattern frequency technique and a data regression technique. As shown in FIG. 2, the dashed trend line 202 for Processor A is computed on the basis of the first four weeks of pattern frequency data for Processor A (plotted at single line 204) and is used to predict a pattern frequency of 30% at Week 5. If, instead, an averaging technique were used, the calculated value of 48.25% would result from the average of the first four weeks of pattern frequency data for Processor A (plotted at single line 204).

Similarly, the dotted trend line 206 for Processor B is computed on the basis of the first four weeks of pattern frequency data for Processor B (plotted at double line 208) and is used to predict a pattern frequency of 70% at Week 5, as compared to a calculated value of 51.75% based on the average of the first four weeks of pattern frequency data for Processor B (plotted at double line 208). As this example illustrates, the predicted pattern frequency values paint a much different and more accurate picture of the pattern frequency trends (70% for Processor B as compared to 30% for Processor A) than is provided by using averaging techniques (51.75% for Processor B as compared to 48.25% for Processor A).

Depending on the extrapolation technique used, there may be predicted values that require additional post-processing. For example, with relatively rapid changes in pattern frequency, predicted pattern frequencies may fall outside of the range of 0%-100%. To address this situation, the predicted values may be capped so that any predicted frequency of less than 0% is changed to 0%, and any predicted frequency of over 100% is changed to 100%.

As will be appreciated, frequent patterns or itemsets may be constructed using database mining techniques to find interesting patterns from databases, such as association rules, correlations, sequences, episodes, classifiers, clusters and the like. The task of discovering and evaluating frequent patterns in a database of items is quite challenging, given that the search space is exponential in the number of items occurring in the database. The present invention discloses techniques for discovering more meaningful pattern frequency information by, for example, accumulating frequent itemset information on a constant or predetermined time interval and then using the information at this aggregate level in a regression analysis to make a prediction about future demand. The projected or predicted values may then be used to calculate or quantify an expected value of a recommendation rule that is based on the subject pattern being forecast.

In an exemplary embodiment, the database pattern mining may be implemented with a data processing system that processes transaction database information to provide a frequent set with attribute-based items identifying the purchased product, and to more efficiently generate association rules from the generated frequent set. For example, data processing may be performed on computer system 10 (see FIG. 1) which may be found in many forms including, for example, mainframes, minicomputers, workstations, servers, personal computers, internet terminals, notebooks, wireless or mobile computing devices (including personal digital assistants), embedded systems and other information handling systems, which are designed to provide computing power to one or more users, either locally or remotely. A computer system 10 includes one or more microprocessor or central processing units (CPU) 38, mass storage memory 11 and local RAM memory 31. The processor 38, in one embodiment, is a 32-bit or 64-bit microprocessor manufactured by Motorola, such as the 680X0 processor or microprocessor manufactured by Intel, such as the 80X86, or Pentium processor, or IBM. However, any other suitable single or multiple microprocessors or microcomputers may be utilized. Computer programs and data are generally stored as instructions and data in mass storage 11 until loaded into main memory 31 for execution. Main memory 31 may be comprised of dynamic random access memory (DRAM). The CPU 38 may be connected directly (or through an interface or bus) to a variety of peripheral and system components, such as a hard disk drive, cache memory, traditional I/O devices (such as display monitors, mouse-type input devices, floppy disk drives, speaker systems, keyboards, hard drive, CD-ROM drive, modems, printers), network interfaces, terminal devices, televisions, sound devices, voice recognition devices, electronic pen devices, and mass storage devices such as tape drives, hard disks, compact disk ("CD") drives, digital versatile disk ("DVD") drives, and magneto-optical drives. The peripheral devices usually communicate with the processor over one or more buses and/or bridges. The foregoing components and devices are used as examples for sake of conceptual clarity and that various configuration modifications are common.

Figure 3:
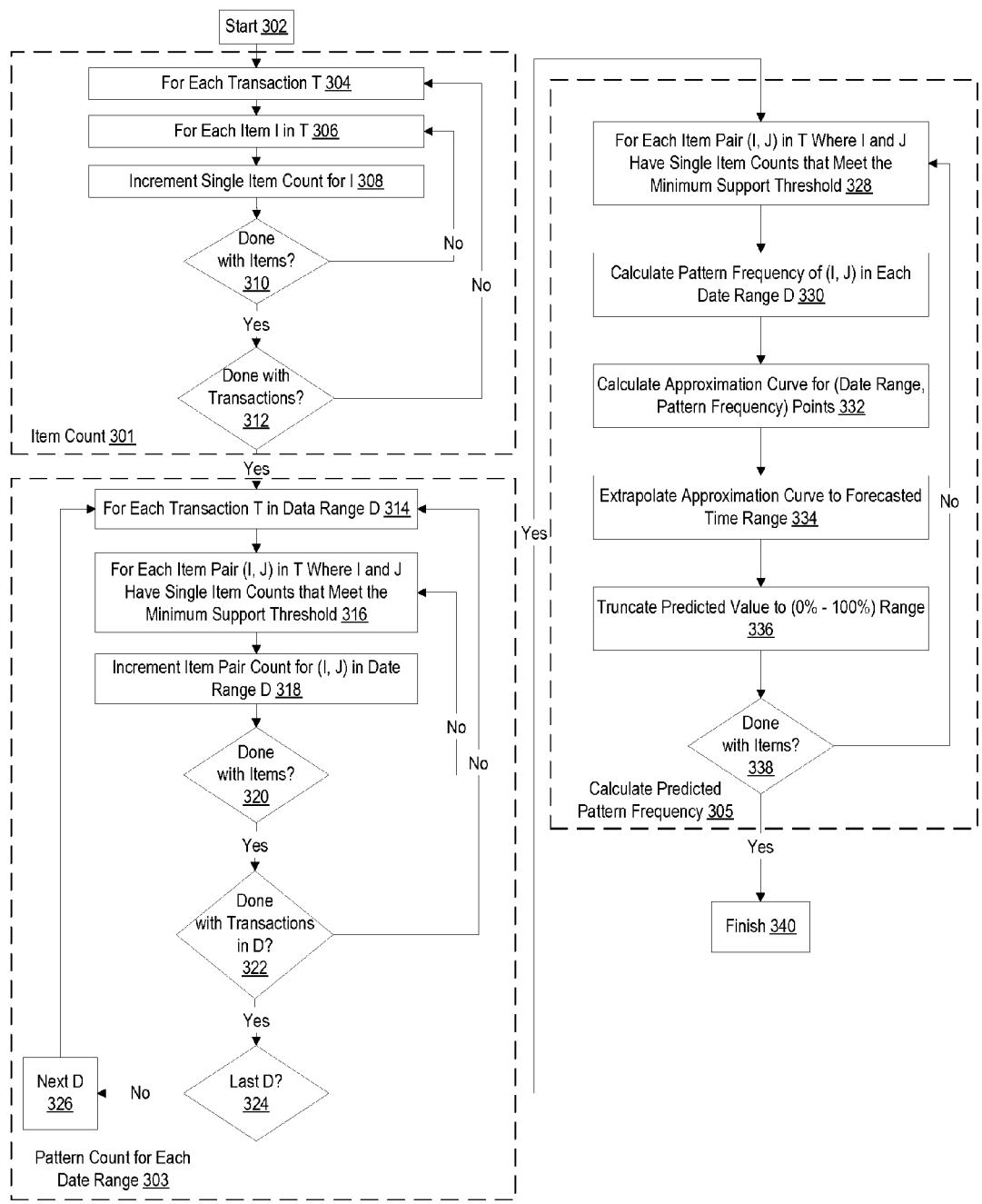
FIG. 3 is a flowchart that schematically illustrates a process for applying data regression and pattern mining to predict future demand.

Turning now to FIG. 3, an exemplary flow methodology 300 is illustrated for predicting or forecasting pattern frequency information by calculating an approximation curve based on historical pattern frequency information. Generally speaking, the depicted methodology determines the single item count for each item in a transaction database (step 301), divides this information into predetermined date ranges for purposes of determining the pattern count values in each date range (step 303), and then calculates the predicted pattern frequency information based on historical pattern frequency data (step 305). While a variety of different calculation techniques may be used to calculate the predicted pattern frequency information, a selected embodiment performs a regression analysis (such as a least-squares approximation or other higher order interpolation technique). As will be appreciated, the methodology illustrated in FIG. 3 shows the steps for generating pattern frequency information within predetermined date ranges and for generating a forecast or prediction of a future pattern frequency value that may be used to evaluate and generate association rules from the items in the frequent set. While the methodology of the present invention may be thought of as performing the identified sequence of steps in the order depicted in FIG. 3, the steps may also be performed in parallel, in a different order, or as independent operations that use historical pattern frequency data to make predictions about future demand for purposes of generating association rules therefrom.

The description of the illustrative method 300 can begin at step 301 where the item count for each item in a transaction database is determined. This count information may be obtained by incrementing a count value (step 308) for each item I (step 306) in each transaction T (step 304) in the transaction database. The item count incrementation step 308 is repeated for all the items in a transaction (negative outcome from decision 310), and for all transactions in the database (negative outcome from decision 312), until the total count for each item in the transaction database is obtained (affirmative outcome from decisions 310, 312).

With the item count established, the pattern count for each predetermined date range may be determined at step 303. In particular, the transaction database may be divided or parsed into predetermined date ranges at step 314. For each transaction in a given date range D, item pairs (I, J) having a single item count that meets a minimum support threshold (step 316) may be counted. The item pair count information may be obtained by incrementing an item pair count value (step 318) for each item pair (I, J) (step 316) in each transaction T in the date range D (step 314). The item pair count incrementation step 318 is repeated for all the item pairs in a transaction (negative outcome from decision 320), and for all transactions in the date range (negative outcome from decision 322), until the total count for each item pair in the transaction date range is obtained (affirmative outcome from decisions 320, 322). The item pair counting process is repeated for each date range in the transaction database (negative outcome to decision 324) by incrementing the date range value (step 326), until all date ranges have been processed (affirmative outcome to decision 324).

With the pattern count for each date range established, the pattern frequency for each item pair (I, J) in each date range is used to calculate a predicted pattern frequency at step 305. In particular, each item pair in the transaction database meeting a minimum support threshold (step 328) is used to calculate a pattern frequency value for the item pair in each date range D (step 330), thereby generating historical pattern frequency data. This historical data may be processed to generate an approximation curve, such as by using interpolation techniques to derive a trend line based on the historical pattern frequency data and date range information (step 332). By extending or extrapolating the trend line to a forecasted or future time range, a predicted value of the pattern frequency for a given item pair is obtained (step 334). Additional processing may be performed when calculating the predicted pattern frequency, such as truncating or capping the predicted value to a predetermined range of values (e.g., 0%-100%) to address situations where the calculated predicted pattern frequency value exceeds the predetermined range of values. The prediction calculation process is repeated for each item pair in the transaction database (negative outcome to decision 338) until a pattern frequency forecast is calculated for each item pair (affirmative outcome to decision 338), at which time the process is finished (step 340).

In accordance with selected embodiments of the present invention, a computer-based methodology and system are provided for mining patterns from a transaction database. As a preliminary step, a first pattern in a transaction database is identified that meets a minimum support threshold requirement. Next, a pattern frequency value for the first pattern is measured over a plurality of predetermined time intervals (e.g., a plurality of recent time intervals or constant time intervals) based on the number of times the first pattern occurs in the predetermined time intervals, and the measured pattern frequency values for the first pattern are then processed to calculate a predicted pattern frequency value for the first pattern. The processing of the pattern frequency values to calculate a predicted pattern frequency values can be done in any desired way, including but not limited to applying a linear least-squares approximation to the pattern frequency values and extrapolating to the predicted pattern frequency value for the first pattern. Alternatively, the prediction may be accomplished by computing a trend line based on the pattern frequency values and extrapolating the trend line to calculate the predicted frequency value for the first pattern. Yet another technique for processing of pattern frequency values is to use a regression analysis to calculate the predicted frequency value for the first pattern. To prevent unreasonable predictions, the predicted pattern frequency value may be capped to an upper (and/or lower) limit to prevent the predicted pattern frequency value from exceeding the upper (and/or lower) limit. However calculated, the predicted pattern frequency value may be used to calculate an expected value of a recommendation rule that is based the first pattern.

As set forth above, the methods and systems for applying data regression and pattern mining to predict future demand as shown and described herein may be implemented in software stored on a computer-readable medium and executed as a computer program on a general purpose or special purpose computer to perform certain tasks. The software discussed herein may include script, batch, or other executable files. The software may be stored on a machine-readable or computer-readable storage medium, and is otherwise available to direct the operation of the computer system as described herein and claimed below. In one embodiment, the software uses instructions and data stored in a local or database memory to implement the data regression and pattern mining techniques so as to improve the ability to predict the future pattern frequency for purposes of forecasting demand. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module. The computer-based data processing system described above is for purposes of example only, and may be implemented in any type of computer system or programming or processing environment, or in a computer program, alone or in conjunction with hardware. It is contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A computer-based method of mining one or more patterns from a transaction database, comprising:
    identifying a first pattern in a transaction database that meets a minimum support threshold requirement;
    for each of a plurality of predetermined time intervals, measuring a pattern frequency value for the first pattern based on the number of times the first pattern occurs in the predetermined time interval; and
    processing the pattern frequency values for the first pattern to calculate a predicted pattern frequency value for the first pattern.

2. The method of claim 1, where the processing of pattern frequency values comprises applying a linear least-squares approximation to the pattern frequency values and extrapolating to the predicted pattern frequency value for the first pattern.

3. The method of claim 1, where the processing of pattern frequency values comprises computing a trend line based on the pattern frequency values and extrapolating the trend line to calculate the predicted frequency value for the first pattern.

4. The method of claim 1, where the processing of pattern frequency values comprises using a regression analysis to calculate the predicted frequency value for the first pattern.

5. The method of claim 1, further comprising capping the predicted pattern frequency value to an upper limit to prevent the predicted pattern frequency value from exceeding the upper limit.

6. The method of claim 1, further comprising capping the predicted pattern frequency value to an lower limit to prevent the predicted pattern frequency value from going below the lower limit.

7. The method of claim 1, further comprising using the predicted pattern frequency value to calculate an expected value of a recommendation rule that is based the first pattern.

8. The method of claim 1, where the plurality of predetermined time intervals comprises a plurality of recent time intervals.

9. The method of claim 1, where the plurality of predetermined time intervals comprises a plurality of constant time intervals.

10. An article of manufacture having at least one recordable medium having stored thereon executable instructions and data which, when executed by at least one processing device, cause the at least one processing device to:
    identify a first pattern in a transaction database that meets a minimum support threshold requirement;
    measure, for each of a plurality of predetermined time intervals, a pattern frequency value for the first pattern based on how many times the first pattern occurs in the predetermined time interval; and
    process the pattern frequency values for the first pattern to calculate a predicted pattern frequency value for the first pattern.

11. The article of manufacture of claim 10, wherein the processing device processes the pattern frequency values by applying a linear least-squares approximation to the pattern frequency values and extrapolating to the predicted pattern frequency value for the first pattern.

12. The article of manufacture of claim 10, wherein the processing device processes the pattern frequency values by computing a trend line based on the pattern frequency values and extrapolating the trend line to calculate the predicted frequency value for the first pattern.

13. The article of manufacture of claim 10, wherein the processing device processes the pattern frequency values by using a regression analysis to calculate the predicted frequency value for the first pattern.

14. The article of manufacture of claim 10, wherein the executable instructions and data, when executed by at least one processing device, cause the at least one processing device to cap the predicted pattern frequency value to an upper limit to prevent the predicted pattern frequency value from exceeding the upper limit.

15. The article of manufacture of claim 10, wherein the executable instructions and data, when executed by at least one processing device, cause the at least one processing device to cap the predicted pattern frequency value to an lower limit to prevent the predicted pattern frequency value from going below the lower limit.

16. The article of manufacture of claim 10, wherein the executable instructions and data, when executed by at least one processing device, cause the at least one processing device to use the predicted pattern frequency value to calculate an expected value of a recommendation rule that is based the first pattern.

17. A system for mining pattern frequencies to calculate a predicted pattern frequency, comprising:
    a database for storing a plurality of transactions, comprising a purchase item having a first pattern frequency; and
    a processing engine to:
        measure, for each of a plurality of predetermined time intervals, a pattern frequency value for the first pattern frequency based on how many times the first pattern frequency occurs in the predetermined time interval; and process the pattern frequency values for the first pattern frequency to calculate a predicted pattern frequency for the first pattern frequency.

18. The system of claim 17, where the processing engine calculates the predicted pattern frequency by applying a linear least-squares approximation to the pattern frequency values.

19. The system of claim 17, where the processing engine calculates the predicted pattern frequency by computing a trend line based on the pattern frequency values and extrapolating the trend line to calculate the predicted pattern frequency.

20. The system of claim 17, where the processing engine calculates the predicted pattern frequency by using a regression analysis to calculate the predicted frequency value for the first pattern.

* * * * *